(12) United States Patent
Linford et al.

(10) Patent No.: US 6,201,472 B1
(45) Date of Patent: Mar. 13, 2001

(54) WIRELESS COMMUNICATION SYSTEM WITH INCREASED DYNAMIC RANGE

(75) Inventors: Karl Linford, East Northport; Kenneth L. Addy, Massapequa, both of NY (US)

(73) Assignee: Pittway Corp., Chicago, IL (US)

(*) Notice: Subject to any disclaimer, the term of this patent is extended or adjusted under 35 U.S.C. 154(b) by 0 days.

(21) Appl. No.: 09/257,416

(22) Filed: Feb. 25, 1999

Related U.S. Application Data

(63) Continuation-in-part of application No. 09/179,115, filed on Oct. 26, 1998, now Pat. No. 6,087,933.

(51) Int. Cl.[7] .................................................. G08B 1/08
(52) U.S. Cl. ........................ 340/539; 340/506; 340/514
(58) Field of Search ............................. 340/539, 825.72, 340/825.69, 506, 514; 455/137, 275, 277.2, 278.1, 273; 375/345, 347; 307/112, 146; 333/103

(56) References Cited

U.S. PATENT DOCUMENTS

| | | | |
|---|---|---|---|
| 4,525,869 | * 7/1985 | Hamada et al. ....................... | 455/277 |
| 4,656,364 | 4/1987 | Yokogawa et al. ................... | 307/146 |
| 4,823,398 | * 4/1989 | Hashimoto ............................ | 455/134 |
| 5,465,411 | 11/1995 | Koike .................................... | 455/275 |
| 5,548,836 | * 8/1996 | Taromaru ............................. | 455/277.1 |
| 5,646,942 | * 7/1997 | Oliver et al. ......................... | 375/347 |
| 5,648,992 | 7/1997 | Wright et al. ........................ | 375/347 |
| 5,661,762 | 8/1997 | Petranovich et al. ................ | 375/347 |
| 5,699,054 | 12/1997 | Duckworth ....................... | 340/825.22 |
| 5,748,079 | * 5/1998 | Addy ................................... | 340/539 |
| 5,761,613 | 6/1998 | Saunders et al. ..................... | 455/137 |
| 5,826,179 | * 10/1998 | Lindenmeier et al. ........... | 455/277.2 |

\* cited by examiner

Primary Examiner—Donnie L. Crosland
(74) Attorney, Agent, or Firm—Greenberg Traurig, LLP; Anthony R. Barkume

(57) ABSTRACT

A method for increasing the dynamic range of the receiver/control unit of an alarm system. The alarm system comprises the receiver/control unit, the receiver comprising at least one antenna apparatus and apparatus for switching the antenna apparatus. The control unit, or processing apparatus, comprises signal detection apparatus and apparatus for controlling the antenna apparatus switching. The method comprises the steps of selecting an input to the receiver, wherein the input maybe an output of one or more antenna apparatus or no antenna apparatus, and detecting the presence of a signal. The basis of the apparatus alarm system is the selection of no antenna, which causes the receiver to be approximately 12 dB less sensitive. The switching of the antenna apparatus is preferably accomplished by processor control of switching diodes. This allows the receiver to detect signals from remote transmitting devices located nearby without saturating the receiver, thereby increasing the dynamic range of the receiver/control unit.

16 Claims, 3 Drawing Sheets

WIRELESS COMMUNICATION SYSTEM WITH INCREASED DYNAMIC RANGE

CROSS REFERENCE TO RELATED APPLICATIONS

This application is a continuation-in-part of U.S. application Ser. No. 09/179,115, filed on Oct. 26, 1998, now U.S. Pat. No. 6,087,933 which is incorporated by reference herein.

BACKGROUND OF THE INVENTION

The present invention relates to alarm systems having multiple remote devices in communications with a receiver/control unit wherein the receiver/control unit comprises one or more antennas; and in particular to such alarm systems wherein the receiver sensitivity is modified to increase the dynamic range of the receiver.

Contemporary radio frequency (RF) wireless security systems, such as those utilizing the ADEMCO 4281 or 5881 receiver, often use receiver antenna diversity for improving reception by counteracting the negative effects of multipath signal fading. The information transmitted from remote devices, which typically describes the state of various sensors, such as smoke, motion, breaking glass, shock and vibration detectors; door, window and floor mat switches; etc, comes from many different locations. In order to receive signals from transmitters at the maximum range, signals from transmitters at close proximity often saturate the receiver.

It is therefore an object of the present invention to provide a low cost method and system for increasing the dynamic range of a fixed gain receiver/control unit.

SUMMARY OF THE INVENTION

In accordance with these and other objects, the present invention is a method for increasing the dynamic range of the receiver/control unit of an alarm system. The alarm system comprises a receiver/control unit having a receiver associated therewith, the receiver comprising at least one antenna means and means for switching the antenna means. The control unit, or processing means, comprises signal detection means and means for controlling the antenna switching means. The method comprises the steps of selecting an input to the receiver, wherein the input maybe an output of one or more antenna means or no antenna means, and detecting the presence of a signal. The signal, likely generated by a remote transmitting device such as an alarm sensor, consists of a single or double pentad, which is one or two groups of five identical messages. Each message contains a preamble, serial number, status, etc. The control unit detects the signal by searching for the message preamble, which is the same for all valid transmissions. When a signal is detected, the selected input to the receiver stays the same until the signal has stopped being transmitted. When a signal is not detected the control unit selects a different input to the receiver. The control unit continuously switches the receiver input from one antenna, to the next antenna, to no antenna until it detects a message preamble.

The basis of the present invention is the selection of no antenna, which causes the receiver to be approximately 12 dB less sensitive. This allows the receiver to detect signals from remote transmitting devices located nearby without saturating the receiver.

The switching of the antenna means is preferably accomplished by processor control of switching diodes. In addition, capacitors may be used for better control of the residual capacitance of the switching diodes in their off state, thereby controlling the conduction of the RF input signal. The alarm system may further comprise a digital-to-analog converter for additional control of the conduction of the RF input signal.

In addition, the method may further comprise the selection of two or more antenna means, causing the receiving means to be approximately 3 dB less sensitive. In this embodiment, the connection of both antennas causes a double termination. The incoming radiated energy is the same, but the input impedance is reduced by the double termination, thereby causing the amplitude of the RF signal into the input amplifier and filters to be lower.

DETAILED DESCRIPTION OF THE PREFERRED EMBODIMENT

Figure 1:
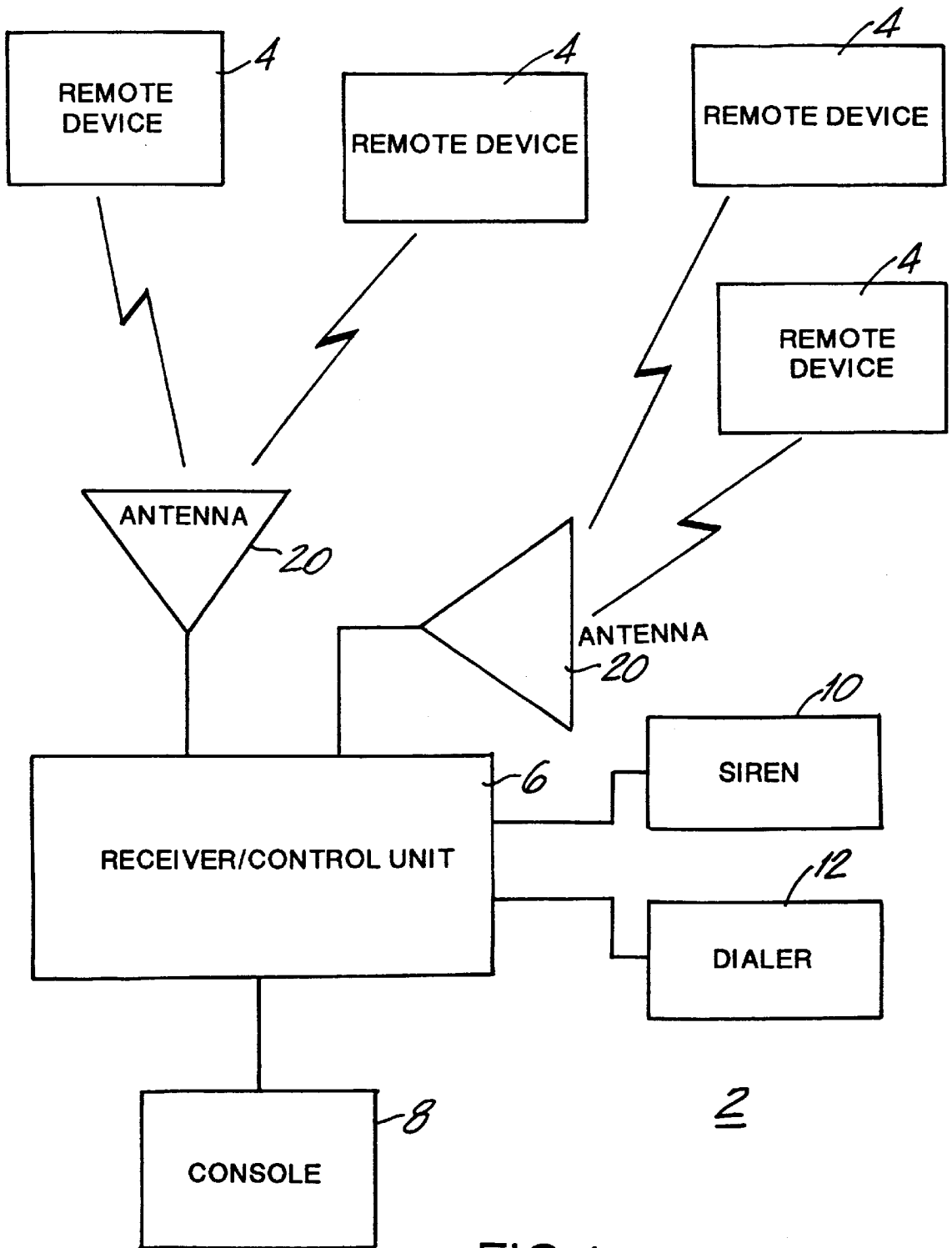
FIG. 1 is a block diagram of the preferred embodiment of the present invention.

Referring to FIG. 1, an alarm system 2 is shown, which includes a receiver/control unit 6 in communications with a plurality of remote devices 4, each of which comprises an alarm sensor and a data transmitting unit. The alarm sensors are well known in the art and include, for example, motion detectors, fire or smoke sensors, glass breakage sensors, door or window entry sensors, and the like. The alarm system 2 operates in a so-called "wireless" fashion by electromagnetic wave transmission (radio frequency in particular) between the remote devices 4 and the antennas 20 of the receiver/control unit 6. The transmitter units housed within each remote device 4 are also well known in the art, and transmit supervision and alarm message signals, by modulating a high frequency RF signal (e.g. 345 MHz). The message signals consist of a single or double pentad, respectively, which is one or two groups of five identical messages. Each message contains a preamble, serial number, status, etc. The control unit detects the signal by searching for the message preamble, which is the same for all valid transmissions. In the preferred embodiment, the modulated RF signal is received by two antennas 20, which are mounted in orthogonal relationship to each other to achieve antenna diversity, although this specific type of mounting is not a requirement and is not the basis of the present invention. The receiver/control unit samples each antenna until a proper message preamble or signal level is detected. At this point, the antenna switching is stopped until the message is completely received, or not present anymore. The receiver/control unit 6 processes and decodes the data from the remote device 4 and then acts accordingly; e.g. by sounding a siren 10, dialing a police or fire station (dialer 12), updating the console 8, etc. Further description of this type of wireless alarm system may be found in U.S. Pat. No. 4,754,261 to Marino, which is owned by the assignee of the present invention and is incorporated by reference herein.

The basis of the present invention is to increase the dynamic range of the receiver in order to better receive signals from transmitters located near and far. This is accomplished by adding the selection of a no antenna mode to a receiver with antenna diversity. This allows the receiver to detect signals from remote transmitting devices located nearby without saturating the receiver. Antenna diversity systems, typically used for improving reception by counteracting the negative effects of signal fading, are well known in the art.

Figure 2:
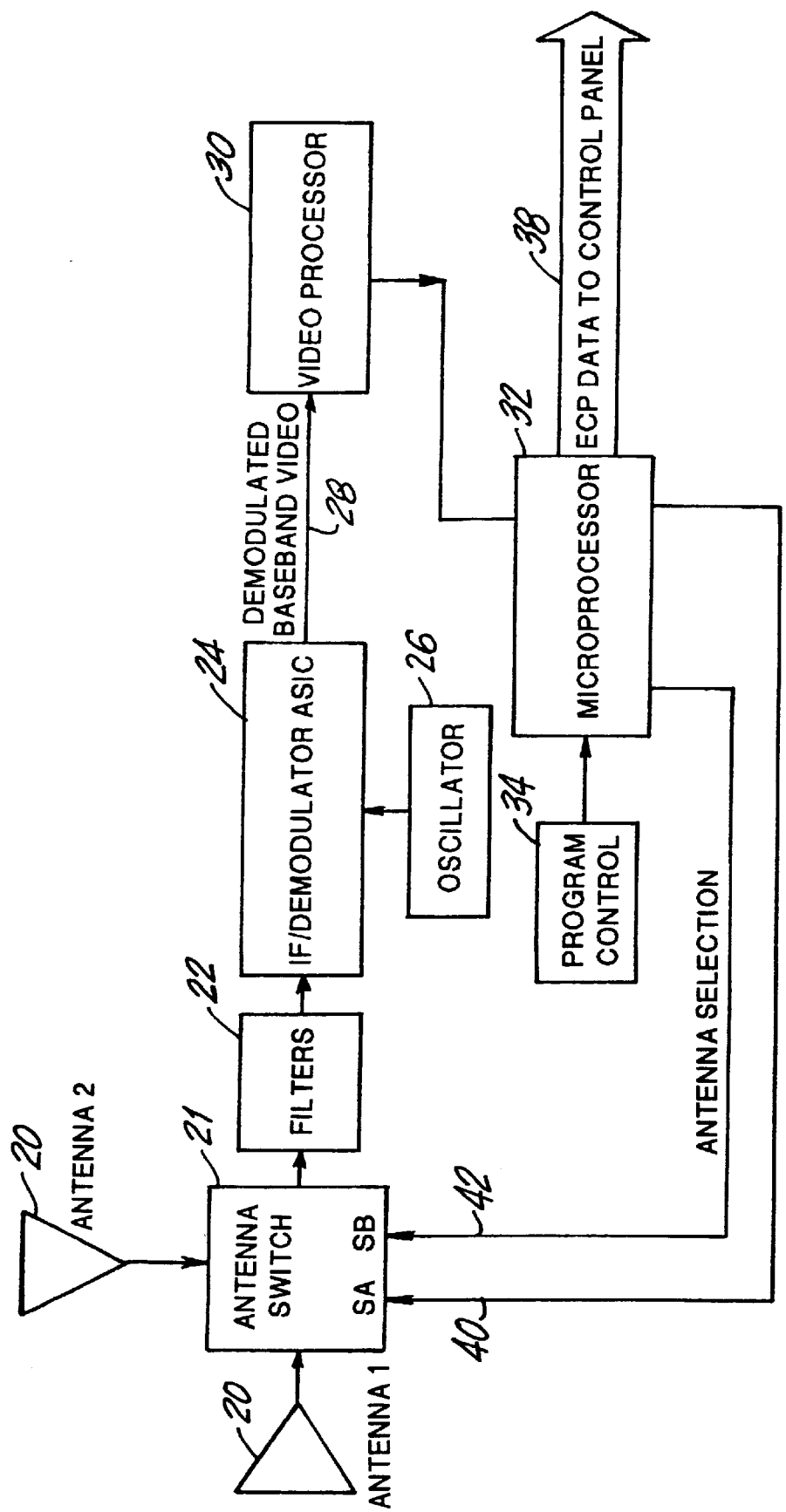
FIG. 2 is a block diagram of the receiver/control unit according to the preferred embodiment of the present invention.

FIG. 2 illustrates the circuit block diagram of the receiver/control unit 6 of the present invention. The antenna configuration is selected by antenna switch 21. The microprocessor 32 outputs control signals 40 and 42 to switch between antenna 1, antenna 2, or no antenna until a proper message preamble is detected by the microprocessor 32. The use of message preambles with every transmission from the remote devices is well known in the art.

The selection of no antenna causes messages sent by remote devices 4 to be received at a sensitivity level approximately 12 dB below normal sensitivity. Even though no antenna means is connected to the processing electronics, the messages are still received because the PIN diodes which are used for antenna switching are not perfect high impedance sources in their off state. Therefore, when the PIN diode is off, there is some residual capacitance which allows conduction of the RF input signal.

An alternative embodiment of the present invention is the selection of two or more antennas to achieve the reduction in receiver sensitivity, thereby increasing the dynamic range of the receiver. In this alternate embodiment, selection of both antennas cause messages sent by remote devices 4 to be received at a sensitivity level approximately 3 dB below normal sensitivity. This embodiment may be used in addition or instead of the present invention. In this embodiment, the connection of both antennas causes a double termination. The incoming radiated energy is the same, but the input impedance is reduced by the double termination, thereby causing the amplitude of the RF signal into the input amplifier and filters to be lower.

Figure 3:
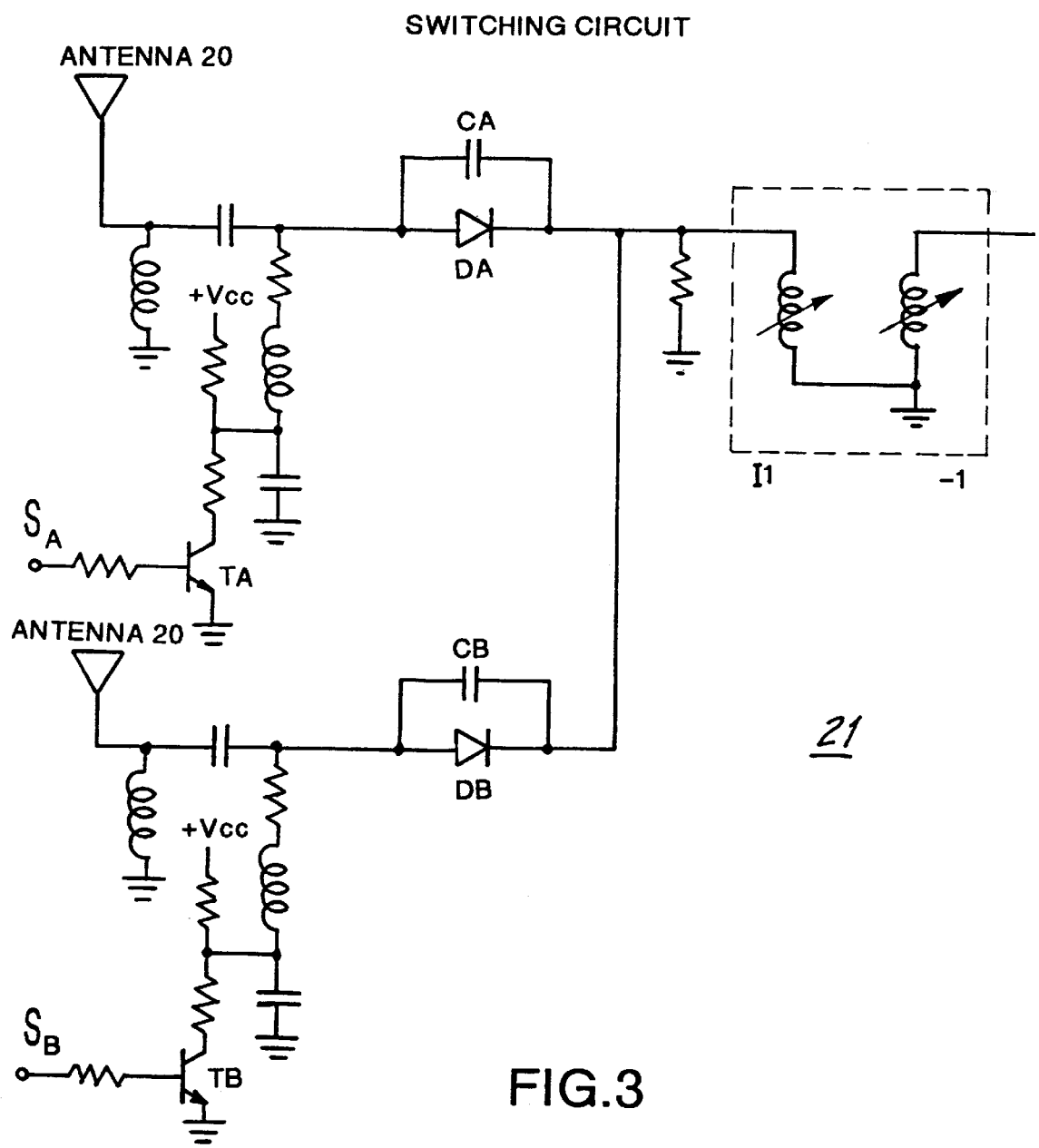
FIG. 3 is a detailed diagram of the antenna switching circuit.

The resulting RF signal from the antennas is then filtered by filter section 22 and demodulated by section 24 in conjunction with a 355.7 MHz oscillator 26 in accordance with techniques well known in the art. A demodulated baseband video signal 28 is fed to a video processor circuit 30. A microprocessor 32, along with appropriate ROM memory device 34, is connected to the antenna switch 21 for supplying appropriate control signals 40 and 42. The control signals input the antenna configuration to the antenna switching circuit 21 shown in detail in FIG. 3.

The antenna switching circuit 21 contains two antennas connected together through PIN diodes DA and DB. The on and off states of the PIN diodes DA and DB are controlled by transistors TA and TB, which in turn are controlled by control signals 40 and 42 from the microprocessor 32. In the on state, the diodes DA and DB allow the energy from their respective antenna to be passed to the filter section through helical filter I1. In the off state, the diodes DA and DB block the energy from their respective antenna from being transmitted. Since the diodes DA and DB are not perfect high impedance sources in their off state, there is some residual capacitance which allows conduction of the RF signal. This capacitance maybe adjusted at the factory or by an installer by adding capacitors CA and CB. The selection of both antennas 20 by the microprocessor 32, causes DA and DB to be turned on. With both antennas on there is a double termination to the input of the filter section 22 and the sensitivity is reduced by approximately 3 dB. Other elements of the antenna switching circuits are basic components known in the art and are not described further.

An alternative more elaborate embodiment would be to control the actual current through the diodes, thereby the attenuation, with a digital to analog converter instead of simply switching the diodes DA and DB to an off state, by means of digital control signals.

It will be apparent to those skilled in the art that modifications to the specific embodiments described herein may be made while still being within the spirit and scope of the present invention. For example, an alarm system containing only one antenna may use the method described in the present invention whereby the current through the associated diode is turned off or controlled by a capacitor or digital to analog converter. In this embodiment, even though a switching diode is not needed for antenna switching (since there is only one antenna), it is used in order to decrease the receiver sensitivity in accordance with the objectives set forth herein.

We claim:

1. In an alarm system comprising a receiver/control unit having a receiver associated therewith, the receiver comprising at least one antenna means and means for switching the antenna means, the receiver control unit comprising signal detection means and means for controlling the antenna switching means, a method for increasing the dynamic range of the receiver/control unit comprising the steps of:

a) selecting an input to said receiver, wherein said input may be an output of one or more antenna means or no antenna means, and b) detecting the presence of a signal.

2. The method of claim 1 further comprising the selection of two or more antenna means.

3. The method of claim 2 wherein the selection of two or more antenna means cause said receiving means to be approximately 3 dB less sensitive.

4. The method of claim 1 wherein the selection of no antenna means causes said receiving means to be approximately 12 dB less sensitive.

5. The method of claim 1 further comprising the step of: when a signal is detected, then receiving the signal with the selected input to said receiver.

6. The method of claim 1 further comprising the step of: when a signal is not detected, selecting a different input to said receiver.

7. The method of claim 1 wherein the step of detecting the presence of a signal is performed by searching for a signal preamble.

8. The method of claim 1 wherein said signal is transmitted by a remote device of said alarm system.

9. An alarm system comprising:

a) receiving means comprising at least one antenna means for receiving a signal, b) switching means, operatively associated with the antenna means, said switching means selecting between an output of one or more antenna means or no antenna means, c) processing means operatively associated with the receiving means, said processing means comprising signal detection means and means for controlling said switching means.

10. The system of claim 9 wherein the selection of no antenna means causes said receiving means to be 12 dB less sensitive.

11. The system of claim 9 further comprising a plurality of remote devices, each of the remote devices having remote transmitter device for transmitting a signal.

12. The system of claim 9 further comprising the selection of two or more antenna means.

13. The system of claim 12 wherein the selection of two or more antenna means causes said receiving means to be 3 dB less sensitive.

14. The system of claim 9 wherein the switching means is performed by switching diodes.

15. The system of claim 14 further comprising capacitors for control of the residual capacitance of said switching diodes in their off state, thereby controlling the conduction of said signal.

16. The system of claim 14 further comprising a digital-to-analog converter for control of said switching diodes in their off state, thereby controlling the conduction of said signal.

* * * * *